Patented Apr. 9, 1946

2,398,120

UNITED STATES PATENT OFFICE 2,398,120

RUST INHIBITOR FOR TURBINE OIL

Hans Schindler, Evanston, Ill., assignor to The Pure Oil Company, Chicago, Ill., a corporation of Ohio No Drawing. Application February 11, 1944, Serial No. 521,971

11 Claims. (Cl. 252—393)

This invention relates to improvements in turbine oils and more particularly to improving resistance of turbine oils to oxidation and to the preparation of inhibitors for preventing rust formation of steam turbines.

In my application, Ser. No. 487,970, filed May 21, 1943, entitled Turbine oil, there is disclosed an oxidation inhibitor and the method for making the same. The oxidation inhibitor therein disclosed is prepared from used caustic alkali solution resulting from the treatment of straight run and/or cracked gasoline and/or kerosene fraction of mineral oil containing phenolic bodies, such as, phenol, cresol, polyhydroxy ring compounds and thiocresols, as well as sulfur compounds, such as, mercaptans and low-boiling fatty acids, such as, formic, acetic and propionic, together with naphthenic acids. The novel oxidation and rust inhibitor disclosed in that application is obtained from the "acid oil" by neutralization of the spent caustic solution with acid or acidic material to a pH of 8 followed by extraction of the separated "acid oil" layer with hexane or other light or low-boiling immiscible solvents, such as, hexane, benzene and light petroleum naphtha in which the "acid oil" is soluble and which has a boiling point sufficiently low to enable it to be readily removed from the "acid oil" by distillation.

The subject matter of this application represents an improvement over the invention disclosed in the aforesaid application, Ser. No. 487,970. It has been discovered that if "acid oil" and particularly the "acid oil" obtained from the used alkali by neutralization to a pH of approximately 8 is filtered through or contacted with a solid adsorbent material such as, silica gel, fuller's earth or other adsorbent clay or activated charcoal, certain deleterious ingredients of unknown composition are adsorbed by the adsorbent with the result that the oxidation and rust inhibiting properties of the "acid oil" are further improved.

In order to demonstrate the invention, "acid oil" was prepared by washing a blend of straight-run and cracked gasoline from a high pressure thermal-cracking operation with an aqueous sodium hydroxide solution containing approximately 10% by weight of sodium hydroxide neutralizing the spent solution with concentrated sulfuric acid until the pH of the solution was 8, and extracting the resulting "acid oil" with three volumes of hexane. This method of preparation is the same as that disclosed in application Ser. No. 487,970. Material so prepared is designated in the following table as "acid oil Example No. I."

After distilling off the hexane, 450 grams of the resulting "acid oil" was dissolved in 450 cubic centimeters of hexane and contacted at room temperature with 400 grams of silica gel added in four portions of 100 grams each without removal of the previous portions. The solution and silica gel were stirred together for a total period of approximately forty minutes. The silica gel was filtered off and washed with hexane until the hexane drained off colorless. The silica gel was then washed with acetone. The hexane was removed from the filtered solution by distillation and 289 grams of resulting "acid oil" representing 64.3% by weight of the charge was obtained. This material is designated in the following table as "acid oil Example No. II."

The extract obtained by washing the silica gel with acetone was distilled to remove the acetone. The remaining extract constituted 143.1 grams and represented 31.8% of the charge. This extraction is referred to in the following table as "acid oil Example No. III."

The material adsorbed on the silica gel, which was not extracted therefrom by the acetone, constituted 3.9% of the charge.

The samples as prepared were blended with Pennsylvania neutral mineral oil having the following characteristics:

| | |
|---|---|
| Gravity A. P. I. | 30 minimum |
| Viscosity Saybolt at 100° F. | 145–155 |
| Pour point | 30° F. maximum |
| Flash point, Pensky-Martin | 395° F. minimum |
| Color N. P. A. | 2½ maximum |
| Viscosity index | 95 minimum |
| Percent sulfur | 0.2 maximum |
| Demulsibility at 120° F. and 160° F. | 1,620 minimum |

One percent by weight of the inhibitor was blended with the oil and the resulting oil was tested for rust preventing characteristics in accordance with tentative A. S. T. M. method D–665–42T for testing rust characteristics of steam turbine oil in the presence of water. This method of testing appears in A. S. T. M. Standards on Petroleum Products and Lubricants for October 19, 1942. The ratings of the various oils are given in the following table.

In addition to testing the three samples prepared as aforesaid, three samples of oil were tested containing m-thiocresol, commercial m,p-cresols and p-tertiary amyl phenol. Results on these tests are also given in the following table.

*Table*

| Test No. | Inhibitor | Inhibitor concentration in oil, weight percent | Rating in turbine oil test |
|---|---|---|---|
| 1 | Acid oil, Example I | 1.0 | 4 |
| 2 | Acid oil, Example II | 1.0 | 5 |
| 3 | Acid oil, Example III | 1.0 | 5 |
| 4 | m-Thiocresol | 0.5 | 1 |
| 5 | Commercial m,p-cresols | 1.0 | 3 |
| 6 | p-Tertiary amyl phenol | 1.0 | 3 |

It will be seen that the "acid oil" which had been contacted with silica gel gave a higher rating than the "acid oil" which had not been contacted. The silica gel-contacted "acid oil" gave a perfect rating of 5. It is also apparent from the results in the table that the silica gel treated "acid oil" is considerably superior to the several phenols tested.

Although the inhibitor which was tested was made by first extracting the "acid oil" with hexane and then contacting with silica gel, the hexane extraction is not necessary. The "acid oil" can be dissolved in a light solvent such as, hexane and contacted with the silica gel without the intermediate hexane extraction. Furthermore, the contact between the "acid oil" and the adsorbent may be accomplished by percolation or filtration through the adsorbent instead of by agitation with suspended adsorbent.

Although improvement in the rust inhibiting properties of "acid oil" in general can be effected by contact with solid adsorbent material, a particularly effective inhibitor can be prepared by treating "acid oil" sprung from used alkali at a pH of 8.

Although solid adsorbent materials in general are useful silica gel is preferred.

It will be seen, therefore, that a method has been discovered for obtaining a highly efficient rust inhibitor from used caustic alkali solutions and that method yields an inhibitor which is superior to that prepared in accordance with the aforesaid application, Ser. No. 487,970.

I claim:

1. The method of preparing a rust inhibitor for steam turbine oils which comprises neutralizing used aqueous alkali solution from the treatment of petroleum distillates containing phenolic bodies to a pH of approximately 8 and contacting with a solid adsorbent material the resulting "acid oil" mixed with a low-boiling solvent for said "acid oil" but which solvent is incapable of extracting from said adsorbent material deleterious ingredients adsorbed from said "acid oil," the amount of said adsorbent and time of contact being sufficient to remove from the "acid oil" ingredients which deleteriously affect the rust inhibiting properties of said "acid oil."

2. Method in accordance with claim 1 in which the solid adsorbent material is silica gel.

3. The method of preparing a rust inhibitor for steam turbine oils which comprises neutralizing used aqueous alkali solution from the treatment of petroleum distillates containing phenolic bodies to a pH of approximately 8, separating "acid oil" from the aqueous layer, extracting the resulting "acid oil" with a low-boiling hydrocarbon solvent, contacting the resulting solution with a solid adsorbent material in sufficient amount and for a sufficient period of time to remove from the "acid oil" ingredients which deleteriously affect the rust inhibiting properties of the "acid oil" and removing the solvent from the treated "acid oil."

4. Method in accordance with claim 3 in which the solid adsorbent material is silica gel.

5. Method in accordance with claim 3 in which the solvent is hexane.

6. The method of improving the ability of "acid oil" to inhibit rusting of steam turbines when incorporated in steam turbine oils in small amounts comprising contacting a solution of said "acid oil" in a low-boiling hydrocarbon solvent with silica gel in sufficient amount and for a sufficient period of time to remove from the "acid oil" ingredients which deleteriously affect the rust inhibiting properties of the "acid oil."

7. Method in accordance with claim 6 in which the "acid oil" is contacted with silica gel while in solution in hexane.

8. The method of preparing a rust inhibitor for steam turbine oils comprising contacting a solution of "acid oil" in a low-boiling hydrocarbon solvent with a solid adsorbent material in sufficient amount and for a sufficient period of time to remove from the "acid oil" ingredients which deleteriously affect the rust inhibiting properties of the "acid oil," washing the adsorbent after contact with said "acid oil" with a low-boiling ketone to extract "acid oil" adsorbed on the silica gel and separating the ketone from the extracted "acid oil."

9. Method in accordance with claim 8 in which the ketone is acetone.

10. The method of preparing a rust inhibitor for steam turbine oils comprising neutralizing used aqueous alkali solution from the washing of petroleum distillate containing phenolic bodies to a pH of approximately 8, separating "acid oil" from the aqueous layer, dissolving the resulting "acid oil" in a low-boiling hydrocarbon solvent, contacting the resulting solution with a solid adsorbent material in sufficient amount and for a sufficient period of time to remove from the "acid oil" ingredients which deleteriously affect the rust inhibiting properties of the "acid oil," washing the silica gel with a low-boiling ketone to extract adsorbed solution and removing solvent and ketone from the extract.

11. Method in accordance with claim 10 in which the solid adsorbent material is silica gel.

HANS SCHINDLER.